United States Patent [19]

Paul et al.

[11] 4,279,627
[45] Jul. 21, 1981

[54] FINE PARTICLE SEPARATION APPARATUS
[75] Inventors: Donald G. Paul; Lester P. Berriman, both of Irvine, Calif.
[73] Assignee: Dresser Industries, Inc., Dallas, Tex.
[21] Appl. No.: 75,343
[22] Filed: Sep. 13, 1979

Related U.S. Application Data

[63] Continuation of Ser. No. 931,604, Aug. 7, 1978, abandoned.
[51] Int. Cl.³ .................... B01D 45/16; B01D 45/10; B01D 47/10
[52] U.S. Cl. ..................................... 55/238; 55/240; 55/396; 55/431; 55/448; 261/79 A
[58] Field of Search ................ 55/238, 240, 90, 92, 55/459 R, 430–432, 452, 448, 460, 396; 210/512 R; 209/144; 261/79 A

[56] References Cited
U.S. PATENT DOCUMENTS

| | | | |
|---|---|---|---|
| 793,110 | 6/1905 | Uehling | 55/240 |
| 2,259,031 | 10/1941 | Fisher | 55/238 |
| 3,177,634 | 4/1965 | Latham, Jr. et al. | 55/238 |
| 3,186,146 | 6/1965 | Latham, Jr. | 55/238 |
| 3,304,695 | 2/1967 | Krochta | 55/238 |
| 3,930,816 | 1/1976 | Miczek | 55/238 |
| 3,933,450 | 1/1976 | Percevaut | 55/238 |
| 3,972,698 | 8/1976 | Klein et al. | 55/460 |
| 3,989,488 | 11/1976 | Wisting | 55/238 |

Primary Examiner—Gregory N. Clements
Attorney, Agent, or Firm—Fred A. Winans

[57] ABSTRACT

An apparatus for separating almost all fine particles, including particles less than 10 microns in diameter, from a gas stream, which requires the input of only a small amount of water and which discharges a correspondingly small amount of particle-water slurry. The apparatus includes a vertical cylindrical chamber having a relatively wide upstream portion that gradually narrows in a transition portion into an elongated throat portion. A central core member extends axially along the throat portion and forms an elongated annular passage. A high velocity gas stream containing fine particles is generally tangentially introduced into the wide upstream portion of the conduit to provide a circulatory flow. Water is introduced through a plurality of parts in the transition portion downstream therefrom, to provide a thin layer of water along the outer walls of the throat. The high velocity circulatory flow of the particle-laden gas along the annular throat region causes fine particles to migrate radially outwardly under high centrifugal forces into the water layer. The water-particle slurry is discharged through a slot in the outer wall of the lower portion of the throat region. The substantially particle-free gas passes through a radial diffuser section therebelow.

7 Claims, 4 Drawing Figures

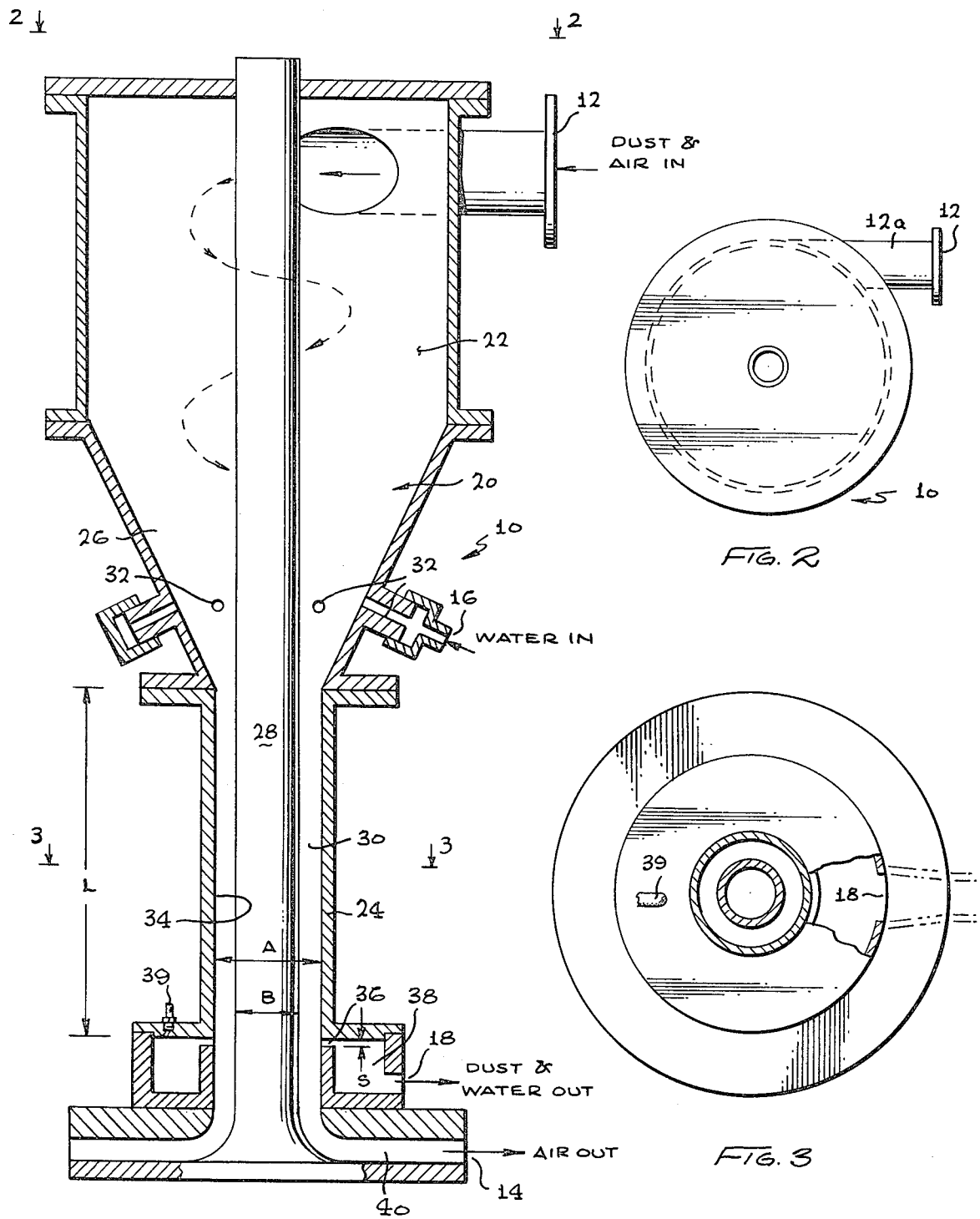

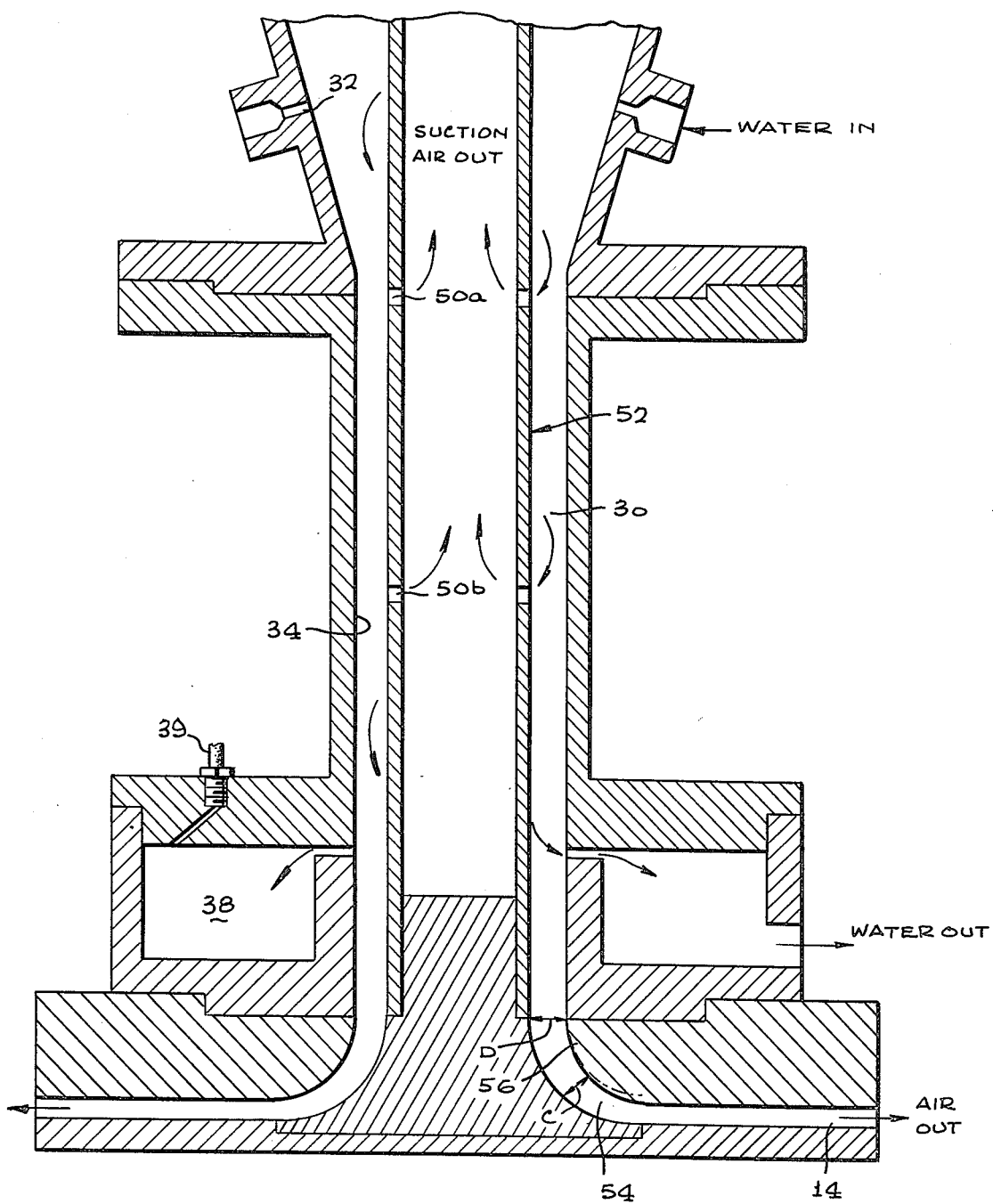

FINE PARTICLE SEPARATION APPARATUS

This is a continuation of application Ser. No. 931,604, filed Aug. 7, 1978, abandoned.

BACKGROUND OF THE INVENTION

This invention relates to apparatus for removing fine solid or liquid particles from a gas stream.

There are many situations where dust must be removed from a gas stream, such as in removing dust from the exhaust of a power plant prior to the exhaust reaching the atmosphere, and in removing dust from air utilized to ventilate a mine shaft. Where only a moderate proportion of the dust particles, such as about 90%, must be removed, and where it is not necessary to remove very fine particles, such as those below 10 microns in diameter, a cyclone type apparatus may be utilized. Such a cyclone device can include a chamber where the particle-laden gas is introduced in circulatory flow thereabout, and a cone-shaped constrictor causes the gas to circulate more rapidly so as to centrifugally force particles to the outside of the stream. The constricted area can be followed by a diffusing chamber which permits the particle-laden air near the outside of the constricted area, to undergo settling so the particles settle out, while air at the center and middle of the constricted area, which is largely free of particles, can be passed into the atmosphere. Passage into the atmosphere with a reverse flow can be accomplished with a vortex finder tube that passes back through the center of the vortex. Such cyclone separators cannot remove more than about 95% of the particles, regardless of how fast the air circulates in the constricted region thereof, because some dust which settles out is always reintrained in the airstream by reason of turbulence. Further, they have not proven effective in removing particles of less than about 10 microns diameter. The cyclone separators usually are operated to generate a G force of no more than about 1000 G's, because higher speeds create increased turbulence which throws settling particles back into the middle of the air stream.

In application where a very high proportion of the dust, such as over 98% thereof, must be removed, and where even fine particles of less than 10 microns in diameter must be removed, venturi scrubbers have been utilized. Such scrubbers direct air in axial flow through a venturi, wherein a water mist is applied to cause the water mist to entrain particles. The venturi passage is followed by a demisting device, such as a cyclone or mesh pad, to remove the particle-water slurry from the airstream. Such devices have a disadvantage in that they require a considerable flow-through of water, such as 3 to 5 gallons of water flow per 1,000 cubic feet of air flow and result in a high rate of evaporation. This has the disadvantage that such devices may not be useful where water sources are limited. Also, the devices necessarily generate considerble outflow of a particle-water slurry, so that storage areas or settling tanks must be provided to handle such an outflow. In fact, the cost of equipment for handling the water-particle outflow of the scrubber can easily constitute the principal portion of the cost of a scrubber installation.

SUMMARY OF THE INVENTION

In accordance with one embodiment of the present invention, a separation apparatus is provided for separating particles from a gaseous flow, which is highly effective in removing a high proportion of the particles. The apparatus includes a generally cylindrical vertically oriented chamber with an upstream portion into which a circulatory flow of particle-containing fluids is established, a funnel-shaped transition portion leads to a narrower throat portion within which the fluid rapidly circulates. Water inlet ports in the transition portion supply water to completely coat the outer wall of the throat with a thin layer. The apparatus also includes a pair of outlet ports in the lower portion including an initial slot for receiving the water-particle slurry from the throat and a terminal diffuser for receiving the substantially particle-free airflow from the throat. In order to permit the settling out of the fine particles from the gaseous stream, the throat portion of the chamber is elongated, with the length of the throat portion being greater than its diameter, so that the particles are subjected to extremely high centrifugal force along a sufficient distance for the particles to settle out of the air and become entrapped in the layer of water flowing on the wall of the throat. A wide central core member occupies the middle of the chamber defining an annular passage with the throat, so that all the particle-containing air is confined to an annular passage area of limited area, to provide a small radius through which the particles must migrate to reach the wetted throat walls. The central core member also prevents the relatively quiescent center of a vortex being formed which would otherwise permit continued entrainment of particles. To prevent the entrainment of particles in a boundary layer adjacent the core member, means are provided to break up the boundary layer, such as holes connected to a vacuum source to draw off boundary layer air.

In order to minimize the pressure differential through the chamber, a discharge diffuser is provided to receive the clean air and convert its axial and rotational velocity into a pressure rise. This can be accomplished by a radial diffuser, wherein the separation of the opposed diffuser walls is decreased along an initial region to the discharge, to provide for more efficient recovery of energy.

BRIEF DESCRIPTION OF THE DRAWINGS

FIG. 1 is a sectional side view of a particle separation apparatus constructed in accordance with one embodiment of the present invention.

FIG. 2 is a view taken on the line 2—2 of FIG. 1.

FIG. 3 is a view taken on the line 3—3 of FIG. 1.

FIG. 4 is a partial sectional view of a particle separation apparatus constructed in accordance with another embodiment of the invention.

DESCRIPTION OF THE PREFERRED EMBODIMENTS

FIGS. 1–3 illustrate a particle separator 10 which has a tangentially directed inlet 12 for delivering air, or other gaseous medium, containing particles, such as dust, and which has a clean air outlet 14 for discharging air which is substantially free of dust. The apparatus also includes a liquid inlet 16 for receiving a dust-entraining liquid such as water, and a slurry outlet 18 for discharging the mixture of the dust entering through inlet 12 and water entering through inlet 16.

The apparatus 10 includes a vertically oriented chamber 20 with a wide upstream cylindrical portion 22, a relatively narrow cylindrical throat 24, and a funnel-shaped transition portion 26 between them. A core member 28 extends along the center of the chamber, particularly the throat portion 24 thereof, to form an annular passage between the member and the chamber wall.

The dust-air mixture entering the inlet 12 circulates about the wide upstream region 22 of the conduit, due to the fact that the inlet 12 extends tangentially to the circular region 22. The mixture moves in a generally helical path towards through the transition region 26 of the conduit where both the rotational and axial velocity of the mixture increases. By the time the mixture reaches the annular throat region 30, it is rotating very rapidly about the core member 28.

Water is introduced into the chamber through several inlet ports 32 in the transition portion. The water coat the outer wall 34 of the throat region with a downwardly flowing layer. As the air rapidly circulates around the throat annulus region, the particles in the air are subjected to very high centrifugal forces, which cause them to migrate radially outwardly and into the layer of water along the throat wall. The particles are entrained in the water, and cannot be readily separated therefrom to again enter the airstream. The centrifugal separation of particles occurs primarily while the airstream moves along the annulus in the throat region 30, and the resulting water and particle slurry flowing downwardly along the outer throat wall 34 moves towards an exit slot 36 formed near the downstream end of the throat portion leading into a low pressure chamber 38, which in turn leads to a slurry outlet 18. A reduced pressure is applied to the chamber 38 through a vacuum hose 39 to aid in drawing the slurry into the chamber. A pipe can be connected to the outlet 18 to carry the slurry to a settling tank or other disposal area.

The air, which is substantially free of dust, flows through the downstream area of the throat portion 30 beyond the slot 36 and into a diffuser section 40 which serves to convert the velocity of the air into a pressure drop to aid in recovering some of the energy in the airflow. The diffuser 40 is a radial type, with the outer diffuser wall at its downstream end extending perpendicular to the upstream end of the diffuser. The radial diffuser saves space as compared to an axial diffuser, and is efficient in that it permits the rapidly circulating air to easily expand by circulating about a gradually increasing radius along the transition from axial to radial flow. In some applications, the air exiting at 14 is merely allowed to escape into the atmosphere, while in other applications the air 14 may be delivered down a mineshaft for ventilation or utilized for other purposes.

The entrainment of large dust particles can be accomplished before the dust and air enters the inlet 12, as by the use of a waterless cyclone filter. Of those particles left in the air, the larger particles will be thrown against the walls of the conduit either along the wide upstream region 22 or along the transition region 26. However, the finest particles will not be rapidly separated out from the air but instead will migrate radially out along a substantial portion of the axial length of the throat portion 30. Since the time required to move to the outer wall depends on how far the particles must move as well as the centrifugal force applied to the particles it, is desirable to make the annular passage of relatively small radial dimension to confine it to a region of high centrifugal forces. The core member 28 accomplishes this, by confining the air flow to the outer part of the conduit throat portion. For example, where the throat portion 24 has a diameter A of one and one-half inches, and where the core member 28 has a diameter B of one inch, so there is a one-quarter inch space at either side of the core member, no particle has to settle out by a distance of more than one quarter inch. This is considerably less than the total three-quarters of an inch settling distance that could occur in the absence of a core member 28. The cross-sectional flow area through the throat is reduced by 44% which still leaves a considerable flow area. In addition, all air in the annular region 30 is subjected to relatively high centrifugal forces. If particles were to come into the center of the chamber throat 24, which would occur in the absence of the core member 28, then particles near the axis of air flow would be subjected to only low centrifugal forces, and the small forces and longer settling distance would result in less effective removal of the particles. In fact, a relatively quiescent region can exist along the axis of the vortex, along which particles are retained in the air flow. Thus, the use of a core member 28 to provide an annular region 30, results in more efficient and effective removal of particles from the airstream. The core diameter B is preferably greater than one half the throat diameter A, so that no particle is more than twice as far from the axis of rotation than any other particle.

The effective length L of the throat portion 30 must be relatively long compared to the diameter A thereof, in order to assure sufficient residence time for the settling out of a large proportion of the small particles such as those below 10 microns in diameter. Experiments have shown that a throat length L greater than the throat outer diameter A is necessary to achieve substantial particle settling, and with L preferably between two and eight times the diameter A. If the throat portion is too long, additional energy losses occur by reason of friction during rapid air rotation, without any additional air particles settling out. The throat portion is preferable of a substantially constant diameter, with the diameter A increasing by much less than 50%, and preferably less than 25% along an axial distance of one throat diameter therealong (i.e. the throat walls should spread apart by less than 30° and preferably less than 15°), since any increase in diameter reduces the air circulation rate and therefore the rate at which fine particles settle out.

The particle separator is preferably operated to create such a rapid circulation of air through the annular throat passage that forces of above 10,000 G's (i.e. 10,000 times the force of gravity on the earth's surface), and preferably above 20,000 G's are created. Such high G forces applied along the throat distance of perhaps several inches enables the rapid settling out of small particles. If a much lower G force were maintained, but over a much longer throat distance, small particles may not settle out because even a small degree of turbulence may then be enough to counteract the only slight tendency to outward drift of small particles.

The introduction of water through the ports 32 is preferably downstream from the upstream portions 22, such as along the transition portion 26 or the beginning of the throat portion 24. It is found that if the water is introduced at a location where the air is moving at a low velocity, then the water tends to form a thick stream that flows as a helix along the throat portion 24 of the conduit. Such a helical stream is not as effective as a well distributed layer of water in entraining the particles. A well distributed layer can be produced by flowing the water in at several points, such as at the inlets 32, and by locating the inlets 32 at a region of high velocity such as at the downstream half of the transition portion 26. Although it is possible to locate water inlets along the throat portion, this tends to waste the throat portion upstream from any such injection point. It also may be noted that the dust tends to collect as a paste at the dry-wet interface on the wall where the water is injected into the airstream. Accordingly, it is desirable to locate the water introduction upstream from the throat portion, to avoid closing off of the throat by the paste. A mechanism can be provided to remove the paste, or the equipment can be shut down at intervals for flushing out or otherwise removing the paste.

It is found that a simple slot 36 works well in removing the water-dust slurry from the chamber. If the slot thickness S is too narrow, the slurry will bridge the slot and some of the slurry will flow out through the clean air exit 14. On the other hand, if the slot is too large, excessive amounts of air will flow out through the slot. In one apparatus wherein the throat outer diameter A was one and one half inch and a water flow of 0.4 gallons per hour was utilized along with a total air flow through the conduit of 70 cubic feet per minute, a slot 36 of 40 mil (thousandths of an inch) width was found to work well.

Although the core member 28 extending along the throat portion of the conduit is highly advantageous, it can lead to the flow through of a small amount of dusty air to the outlet 14. This can result from boundary layer flow of air along the surface of the core member 28. To avoid this, a means can be provided for interfacing with laminar boundary layer flow. One effective means, shown in the embodiment of FIG. 4, uses holes 50a and 50b formed in the walls of a tube 52 that serves as the throat core member, and by applying a low pressure to the inside of the tube. This results in withdrawing the thick boundary layer which builds up along the surface of the center core member 52, to prevent the dust entrained in the boundary flow from reaching the clean air exit. It has been found that two groups of holes, one group 50a at the beginning of the throat portion 30 and another group 50b at the axial middle of the throat region, works well in minimizing the amount of dust in the air passing out of the clean air exit. Of course, a variety of other methods can be utilized to break up the boundary layer, although the use of the low pressure outlets 50 has been found to work well. A vacuum can be applied to the center of tube 52, as well as to the hose 39 which is applied to the slurry-receiving chamber 38, by a centrifugal pump whose outlet is connected to the dusty air inlet 12.

The amount of energy utilized to operate the particle separation apparatus, depends to a considerable degree upon how effectively the airstream is diffused. As mentioned above, a radial diffuser has advantages in providing efficient diffusion in a relatively compact device. It is possible to construct a diffuser as shown in FIG. 1, with the width of the diffuser, between its inner and outer walls being constant. However, it is found that a somewhat greater efficiency is provided by narrowing the distance C (FIG. 4) between the inner and outer walls of the diffuser slot 54 along the curved portion which extends from the throat region 30 to the air outlet at 14. This is because the increasing radius of the diffuser slot 54 can provide a cross-sectional flow area that increases too rapidly for efficient recovery of energy. In one diffuser apparatus of the type shown in FIG. 4, wherein the annular spacing D at the downstream end of the throat was 0.25 inch, the slot width gradually decreased to a separation C of 0.18 inch along the curve. This curved region 56 of the diffuser is of the greatest importance in recovering energy, inasmuch as most of the energy is recovered along the initial regions of expansion.

Extensive tests have been conducted utilizing a separation apparatus of the types shown in FIGS. 1-4. The laboratory model utilized an inlet pipe 12a of one and one quarter inch diameter directed tangentially into an upstream chamber portion 22 of 7 inches diameter. It may be noted that vanes can be used to convert axial flow to circulatory flow. The throat portion 24 had an inside diameter A of one and one half inches, and a core diameter B of one inch set concentrically therewithin. The length L of the annular passageway of the throat was adjustable between one and one half inches and eighteen inches. The slot 36 was formed with a width of about 35 mil. (thousandths of an inch) and the radial diffuser 40 was formed with a nominally one quarter inch slot width. The core member or center pipe 52 (FIG. 4) had a row of holes at the entrance point and also at the halfway point, of the throat portion as shown. This apparatus was tested by pumping in a controlled amount of air into which a controlled amount of selected dust had been added, while water was pumped in through eight inlet holes 32 located upstream from the throat. An air flow of 70 CFM (cubic feet per minute) and a water flow of 0.4 GPH (gallons per hour) was applied, which represents a water rate of 0.1 gallons per 1,000 cubic feet. This compares to the typical water rate of 3 to 5 gallons per 1,000 cubic feet for a prior art venturi scrubber. In one set of tests, the dust entrained in the incoming air was cement kiln baghouse dust of a median diameter of 5 microns, while in another set of tests, the dust was talc (John-Mansville Micro 507) of a median diameter of 2 microns. With a pressure drop of about 22 inches water across the device (with no diffuser used) between the dusty air inlet 12 and the clean air outlet, the device operated to remove about 98.7% of the mass of the particles. It is projected that, with an efficient diffuser at 40, the same efficiency of particle removal can be obtained with a pressure drop of only about 11 inches of $H_2O$.

For most applications, a large flow rate of dusty air must be handled, so that a larger apparatus must be utilized. However, because the apparatus 10 depends upon centrifugal force to remove particles from an airstream, and because increasing the diameter of the throat region 30 results in smaller centrifugal forces for a given air velocity, there are limits to the practical scale up of the device. For example, the above-described laboratory device obtained a dust collection efficiency of 98.5 to 99% with a centrifugal force level of 20,000 G's, at a total velocity of 250 FPS (feet per second) and at an energy consumption of 22 inches of $H_2O$ which can be decreased to about 11 inches of $H_2O$ with optimum diffuser design. As the throat diameter increases to handle a greater volume flow of dusty air, a progressively higher air speed must be maintained in order to achieve the high centrifugal force levels of about 20,000 G's needed to precipitate out small dust particles along the throat area. However, the increasing air velocity results in larger friction losses, so that a greater pressure differential must be maintained between the air inlet 12 and the diffuser outlet 14. Studies have shown that a vortex venturi apparatus of the type illustrated in the figures, which can achieve collection efficiency of about 98.5 to 99%, can be constructed to handle on the order of 4,000 CFM with an energy consumption of no more than about 30 inches $H_2O$ which is the energy (actually the pressure drop) required to operate other wet scrubbers wherein a water mist is supplied to air that passes in a solely axial direction through a venturi. Where an apparatus is required to handle a large flow of dust laden air, a group of moderate sized units of the type illustrated FIGS. 1-4 can be utilized in parallel, although axial diffusers then may be used to enable close packing of the units.

The large diameter upstream chamber portion 22 and a transition 26 leading from there to the throat, is useful in minimizing the required length of the throat region 30. However, is possible to utilize vanes along the beginning of a throat to avoid the need for the large diameter conduit portion 22. However, such vanes increase the required throat length because an additional throat length is required for the vanes and a further throat length is required to allow quieting of much of the turbulence created by the vanes. The increased throat length generates increased energy losses through the device. Also, the use of vanes along the throat would eliminate the transition region along which to inject water to avoid a paste buildup in the throat. The upstream conduit portion 22 is preferably of at least twice the diameter of the throat, so that large energy losses do not occur along it or the transition region, where rapid air circulation is utilized.

The apparatus of the present invention has important advantages over present air scrubbers, as it utilizes a relatively small amount of water, such as about 2 to 3 percent of the water utilized for a prior art venturi scrubber for removing small particles wherein the airstream is subjected to a water mist and passed in an axial direction through a venturi. This results in reducing the amount of equipment needed to handle the dust-water slurry which can constitute a major portion of a scrubber installation. The present apparatus uses very little water because the contact area between the water and the air is at a minimum, the contact being primarily along the outer wall of the venturi rather than all across the air stream. An associated advantage of the present apparatus, is that it enables operation on a high temperature gas stream. Prior art venturi scrubbers cannot operate at elevated temperatures above about 200° F. due to excessive evaporation of injected water, so the hot stream must be cooled before entering the prior art venturi scrubber. The present vortex venturi scrubber, however, presents a minimum transfer area between water and air, so that it is possible to operate at gas stream temperatures considerably above 200° F. Rough calculations have shown that the present vortex venturi can operate with gas flows at temperatures of about 400° to 500° F. without losing the collection film of water that flows along the outer wall of the venturi to entrain dust particles. Accordingly, cooling water losses and stream problems present in the prior art can be avoided.

The apparatus of the present invention can be utilized as a demister to remove small droplets of water or other liquid including those less than 10 microns in diameter, from a gas stream. In that application, the small droplets are essentially particles, that settle against the outer venturi wall when subjected to high centrifugal forces along an extended length of a throat region. An injected entrainment liquid may be useful in some applications, as to immediately dissolve the liquid particles reaching the venturi outer wall, while not being necessary in other applications.

Accordingly, the invention provides apparatus for removing fine particles from a gaseous stream, including particles of less than 10 micron diameter which have been previously commercially removed by use of venturi scrubbers, in a manner that requires only a small inflow of water or other particle-entrapping liquid and which produces a correspondingly small outflow of a dust and water slurry, which operates efficiently, and which can be utilized with hot gasses. This can be accomplished by the use of a venturi into which rapidly circulating gas is moved, with the length of the venturi preferably greater than its diameter, to provide a considerable length along which fine particles can precipitate out of the gas steam by means of high centrifugal forces. Water is introduced into the chamber that carries dusty air, but only enough water to reliably coat the ouer wall of the venturi, rather than to provide a mist to mix with particles while they lie anywhere across the cross-section of the airstream. The water is introduced along a partially constricted area of the flow path, where there is rapid air circulation, to assure that substantially all areas of the venturi outer wall will be coated with water. A central core member is provided along the venturi to provide an annular passage which permits the settling particles to settle out along a smaller distance, and which resists the entrainment of particles along the center of a vortex. Means can be provided to break up the boundary layer flow along the central core member, as by the use of holes to which a low pressure is applied, to withdraw the boundary layer flow along the core. The particle-water slurry developed along the elongated venturi, can be removed through a narrow slot, while the relatively dust free air can be passed through an expander to minimize the amount of pressure drop across the entire apparatus. A radial expander can be utilized, wherein the width of the diffuser slot actually decreases along the curve that directs the general air flow from an axial to a radial direction.

Although particular embodiments of the invention have been described and illustrated herein it is recognized that modifications and variations may readily occur to those skilled in the art, and consequently, it is intended that the claims be interpreted to cover such modifications and equivalents.

The embodiments of the invention in which an exclusive property or privilege is claimed are defined as follows:

1. A particle separation apparatus, comprising:
   (a) a vertically oriented substantially cylindrically-shaped chamber enclosing an axially extending concentric member to define an annular fluid flow path through said chamber, said concentric member having means for breaking up boundary layer flow therealong;
   (b) an inlet adjacent the upper end of the chamber through which a stream of particle-laden gas is introduced into the flow path;
   (c) means for establishing a helical flow of the gas stream through the annular flow path;
   (d) means for introducing downwardly flowing liquid into the chamber downstream from the gas inlet in the form of a film of said liquid substantially coating the inner wall of the chamber in a portion of the annular flow path through which the gas is circulating for entrainment of dust particles centrifugally forced into contact with the layer of liquid on the inner wall;

(e) first and second outlets in fluid communication with the interior of said chamber downstream from said portion of the annular flow path therein for first removing the particle-liquid mixture and subsequently removing relatively dust-free gas from said apparatus, and wherein the first outlet includes a slot located around the conduit wall, and means for applying a lower pressure to the slot for withdrawing particle-laden liquid therethrough from the chamber.

2. The apparatus described in claim 1 wherein:

said concentric member includes a tube, a plurality of holes being formed in the tuube for flowing air through the holes, and means for applying a reduced pressure to the inside of the tube to draw in gas from said portion of said annular flow.

3. The apparatus described in claim 1 wherein:

said portion of said annular flow has an axial extent at least twice its outer diameter.

4. The apparatus described in claim 1 wherein:

said chamber includes an upstream cylindrical portion of greater diameter than said portion of said annular flow path and a converging transition portion therebetween; and said means for introducing a liquid into the chamber includes a plurality of liquid inlet openings spaced apart around said transition portion of said conduit at a location spaced from said upstream portion and from said portion of said annular flow path, whereby to uniformly coat the wall defining said portion while minimizing blockage of gas flow therethrough by a liquid-particle paste.

5. The apparatus of claim 1, wherein the means for establishing a circulatory flow includes locating the inlet generally tangential to the conduit.

6. The apparatus of claim 1, wherein said second outlet includes a diffuser at the downstream end of the core, the diffuser and chamber inner wall gradually flaring outwardly to form an extension of the gas flow path with gradually increasing diameter.

7. The apparatus described in claim 6 wherein:

the distance between the inner and outer wall defining the diffuser gradually decreases downstream.

* * * * *